US008579752B2

(12) United States Patent
Fox et al.

(10) Patent No.: US 8,579,752 B2
(45) Date of Patent: Nov. 12, 2013

(54) HYDRAULIC COUPLING HAVING IMPROVED HYDRAULIC PORTING PATH DESIGN

(75) Inventors: Matthew George Fox, Ceresco, MI (US); Patrick John McMillan, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 588 days.

(21) Appl. No.: 12/728,327

(22) Filed: Mar. 22, 2010

(65) Prior Publication Data

US 2011/0226578 A1 Sep. 22, 2011

(51) Int. Cl.
*F16H 48/22* (2006.01)
*F16D 43/28* (2006.01)

(52) U.S. Cl.
USPC .................... 475/88; 475/120; 192/103 F

(58) Field of Classification Search
USPC .......................................... 475/88; 192/103 F
See application file for complete search history.

(56) References Cited

U.S. PATENT DOCUMENTS

| 5,655,983 | A | | 8/1997 | Dick |
| 5,667,045 | A | | 9/1997 | Cummings, III |
| 5,702,319 | A | | 12/1997 | Baxter, Jr. |
| 5,735,764 | A | | 4/1998 | Shaffer et al. |
| 5,967,180 | A | * | 10/1999 | Yates, III .................... 137/539 |
| 6,161,643 | A | | 12/2000 | Bober et al. |
| 6,183,387 | B1 | * | 2/2001 | Yoshioka .................... 475/88 |
| 7,007,782 | B2 | | 3/2006 | Anwar et al. |
| 7,051,857 | B2 | * | 5/2006 | Babin .................... 192/103 F |
| 7,059,460 | B2 | | 6/2006 | Duan et al. |
| 7,210,566 | B2 | * | 5/2007 | Baxter, Jr .................... 192/35 |
| 7,318,511 | B2 | * | 1/2008 | Grogg .................... 475/88 |
| 7,980,983 | B2 | * | 7/2011 | Schrand et al. ............... 475/231 |
| 2005/0167228 | A1 | * | 8/2005 | Baxter .................... 192/49 |

FOREIGN PATENT DOCUMENTS

| EP | 1574737 A1 | 9/2005 |
| WO | 2009083095 A1 | 7/2009 |
| WO | 2010113018 A1 | 10/2010 |

OTHER PUBLICATIONS

European Patent Office, International Search Report and Written Opinion in counterpart International Application No. PCT/IB2011/000572, Date of Mailing: Jul. 27, 2011.

* cited by examiner

*Primary Examiner* — Justin Holmes
*Assistant Examiner* — Jacob S Scott
(74) *Attorney, Agent, or Firm* — Dykema Gossett PLLC

(57) ABSTRACT

A hydraulic coupling for use in a vehicle drivetrain to couple a pair of rotary members and includes a coupling mechanism supported in a casing and that is operable to couple the pair of rotary members together. A piston is responsive to pressurized fluid generated by a pump to move between first and second positions, thereby engaging the coupling mechanism. The pump has an outlet located in a direction away from the piston. An internal passage provides fluid communication between the outlet of the pump and an expandable chamber formed adjacent the piston. A control valve controls the flow of pressurized fluid from the pump between the sump and the expandable chamber.

20 Claims, 5 Drawing Sheets

HYDRAULIC COUPLING HAVING IMPROVED HYDRAULIC PORTING PATH DESIGN

BACKGROUND OF THE INVENTION

1. Field of the Invention

The present invention relates, generally, to hydraulic couplings and, more specifically, to a hydraulic coupling having an improved hydraulic porting path design.

2. Description of the Related Art

Hydraulic couplings are well known devices used in vehicle drivetrains. Typically, hydraulic couplings are operatively supported within a housing and are in fluid communication with a source of hydraulic fluid. These devices operate to couple a pair of rotating members, such as drive shafts or axle half shafts about a rotational axis. Thus, hydraulic couplings have been employed as a part of transfer cases that operatively couple the front and rear axles of a vehicle, in limited slip and locking differentials used to couple axle half shafts, as well as other applications commonly known in the art.

While hydraulic couplings known in the related art have generally worked for their intended purposes, certain deficiencies still remain. For example, hydraulic couplings typically use a source of pressurized fluid to actuate a coupling member to couple the associated rotating shafts together. However, when coupling of the shafts is not desired, there still may remain a residual back pressure in the system which causes an increase in drag through the coupling and can increase the noise, vibration and harshness (NVH) when the hydraulic coupling is operating in an open condition. In addition, there remains a need in the art to reduce the packaging space required for hydraulic couplings and to simplify the overall design of devices used for these applications.

SUMMARY OF THE INVENTION

The present invention overcomes the disadvantages in the related art in a hydraulic coupling for use in a vehicle drivetrain including a pair of rotary members. The hydraulic coupling includes a casing operatively supporting the pair of rotary members. A coupling mechanism is supported in the casing and is operable to selectively couple the pair of rotary members together. A piston is moveably supported in the casing between a first position and second position thereby defining an expandable chamber. A pump is operable to provide a source of pressurized fluid in response to differential movement between the pair or rotary members. The pump has an outlet in a direction away from the piston. An internal passage provides fluid communication between the outlet of the pump and the expandable chamber. In addition, the hydraulic coupling of the present invention includes a control valve having an open position wherein pressurized fluid is directed toward a sump and a closed position wherein pressurized fluid is directed to the expandable chamber to move the piston to its second position to actuate the coupling mechanism to couple the rotary members together.

In this way and as explained in greater detail below, the present invention employs an improved porting strategy that reduces back pressure clutch torque thereby reducing losses through the hydraulic coupling when it is operating in its open condition. Similarly, the present invention reduces NVH when the hydraulic coupling is operating in the open condition. Moreover, the hydraulic coupling of the present invention reduces the packaging space required for the system and simplifies the overall design of the device, as will be described in greater detail below.

Other objects, features and advantages of the present invention will be readily appreciated, as the same becomes better understood after reading the subsequent description taken in connection with the accompanying drawings wherein:

DETAILED DESCRIPTION

Figure 1:
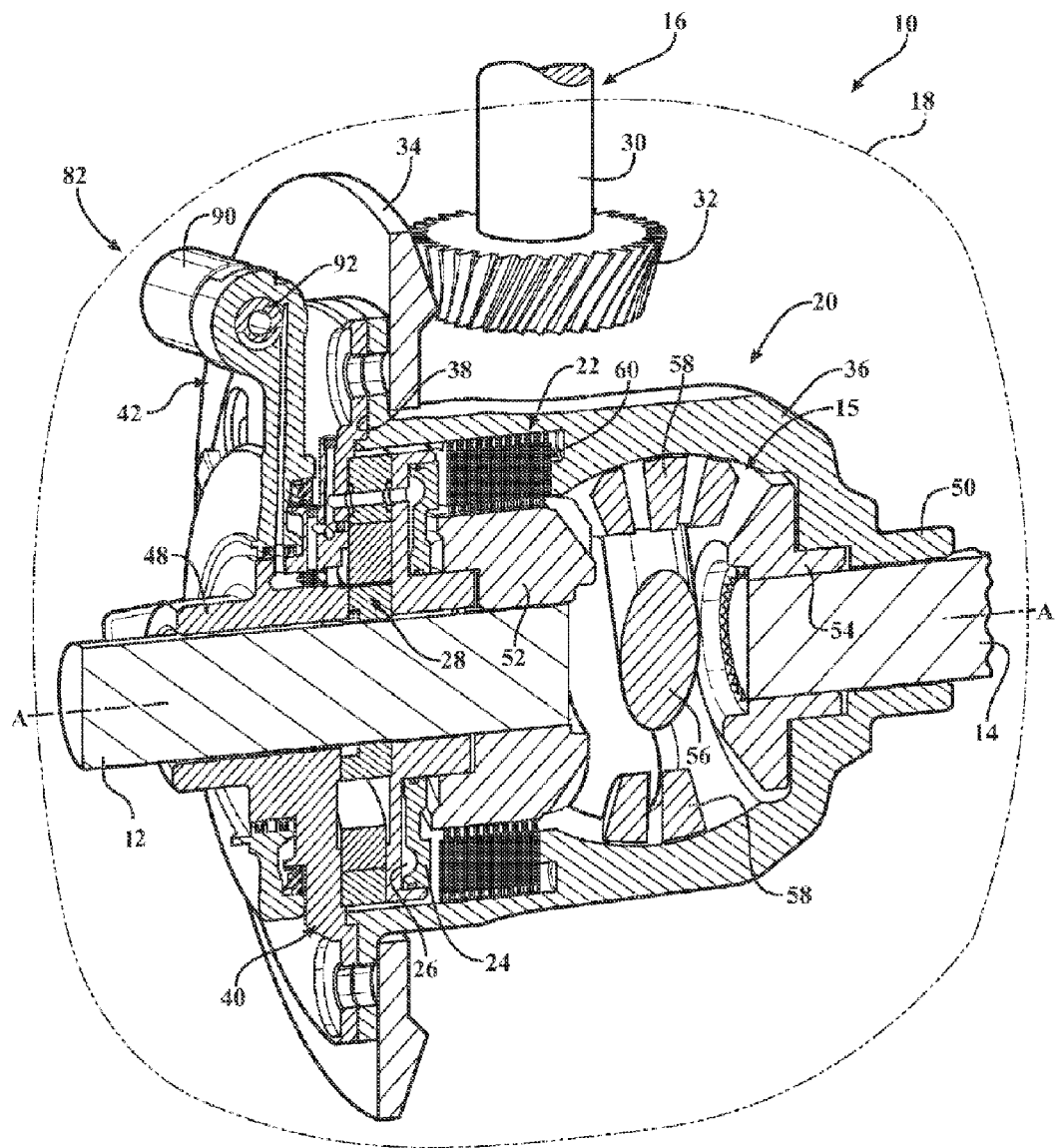
FIG. 1 is a cross-sectional side view of the hydraulic coupling of the present invention.

A representative example of a hydraulic coupling for use in a vehicle drivetrain is generally indicated at 10 in FIG. 1, where like numerals are used to designate like structure throughout the drawings. Those having ordinary skill in the art will appreciate that hydraulic couplings may be employed as a part of transfer cases that operatively couple the front and rear axles of a vehicle; as a part of limited slip, or locking differentials used to couple axle half shafts; as well as other applications in vehicle drivetrains as is commonly known in the art. Thus, those having ordinary skill in the art will appreciate from the description that follows that the purpose of the figures is to illustrate one example of the present invention, and are not meant to limit it.

Figure 4:
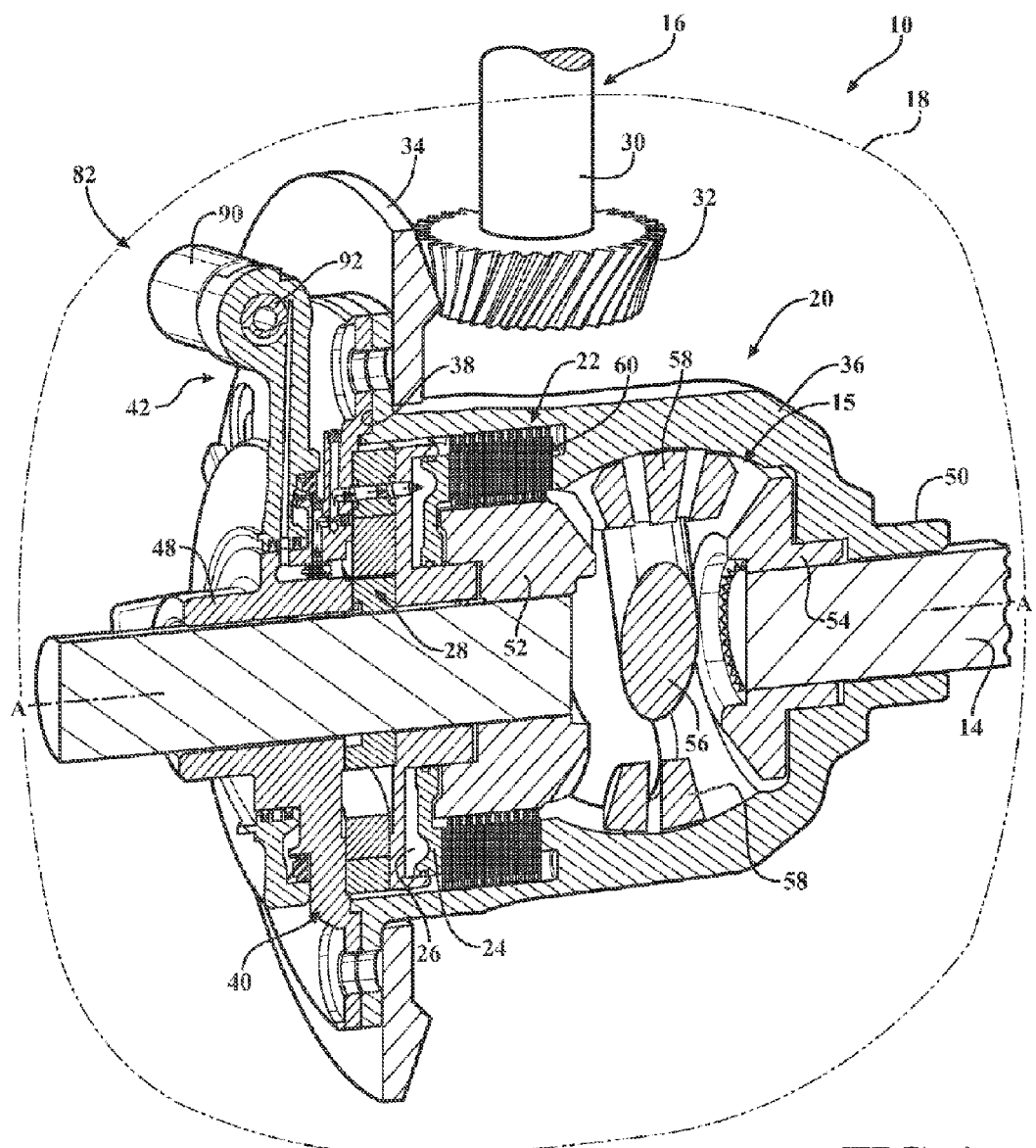
FIG. 4 is a cross-sectional side view of the hydraulic coupling of the present invention illustrating the hydraulic coupling in its closed position.

As noted above, the hydraulic coupling 10 is used in a vehicle drivetrain that includes a pair of rotary members 12, 14. To this end and as best shown in FIGS. 1 and 4, the hydraulic coupling is rotatably driven from the vehicle engine by a torque input member, generally indicated at 16, and operates to drive a pair of axle half shafts 12 and 14 that respectively embody a pair of rotary members which rotate about a rotational axis A. The hydraulic coupling includes a housing represented in phantom at 18 that typically contains hydraulic fluid and has suitable unshown seals through which the rotary members 12, 14 and torque input member 16 project. In the representative example illustrated herein, the hydraulic coupling includes a differential, generally indicated at 15, that is supported within the housing 18. In the embodiment illustrated here, the axle half shafts 12 and 14 driven by the torque input member 16 may be selectively coupled together, as will be described in greater detail below.

To this end, the hydraulic coupling 10 further includes a casing, generally indicated at 20, that operatively supports the pair of rotary members 12, 14. The casing 20 is supported in the housing 18. A coupling mechanism, generally indicated at 22, is supported in the casing 20 and operable to selectively couple the pair of rotary members 12, 14 together. A piston 24 is moveably supported in the casing 20 between a first position and a second position such that an expandable chamber 26 is defined therebetween. A pump, generally indicated at 28 in FIGS. 1 and 4, is operable to provide a source of pressurized fluid in response to differential movement between the pair of rotary members 12, 14. Each of the components will be described in greater detail below.

Figure 3:
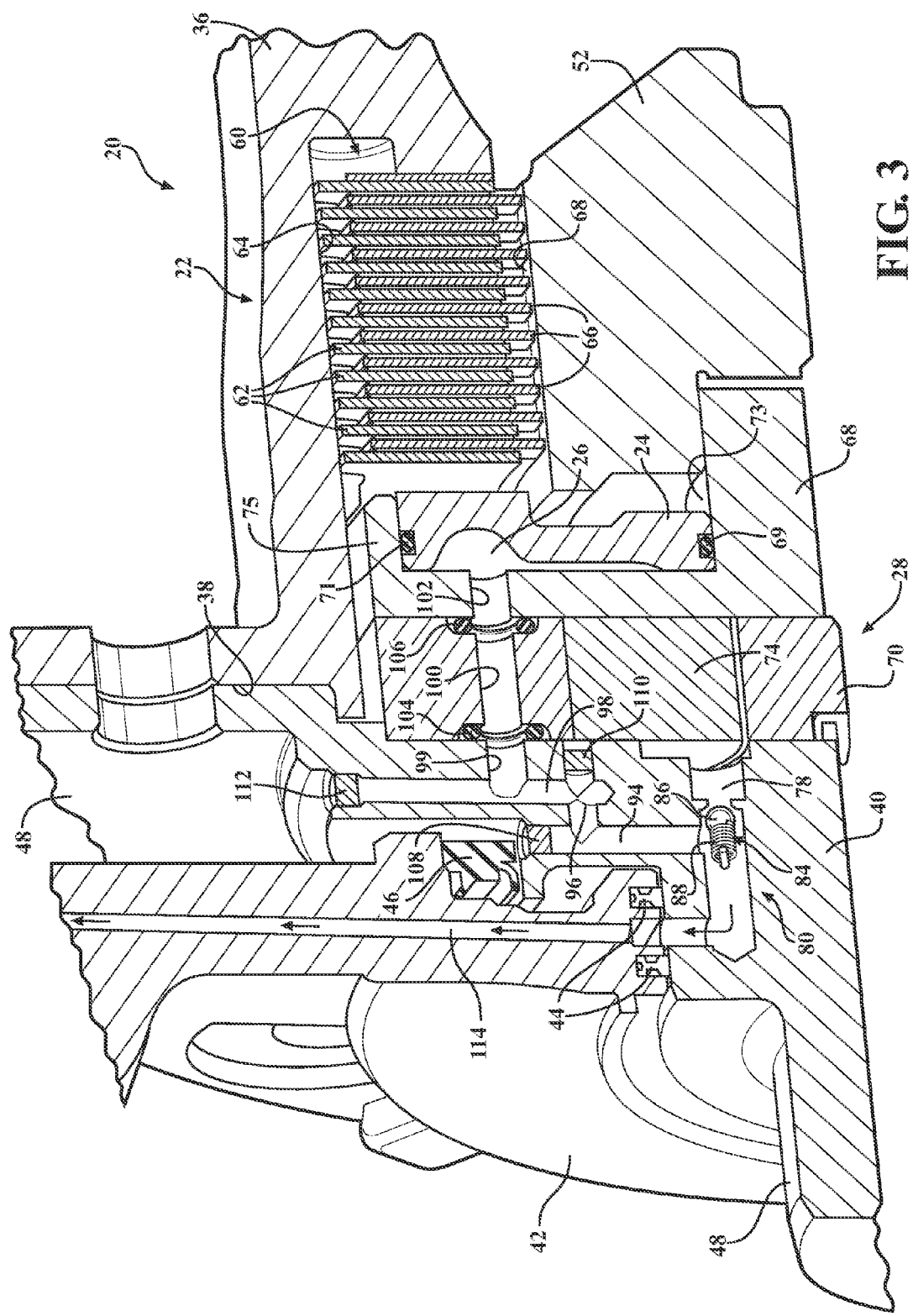
FIG. 3 is an enlarged partial cross-sectional view of the hydraulic coupling shown in FIG. 1 illustrating the coupling mechanism and the fluid path when the coupling mechanism is operating in its open condition.
Figure 5:
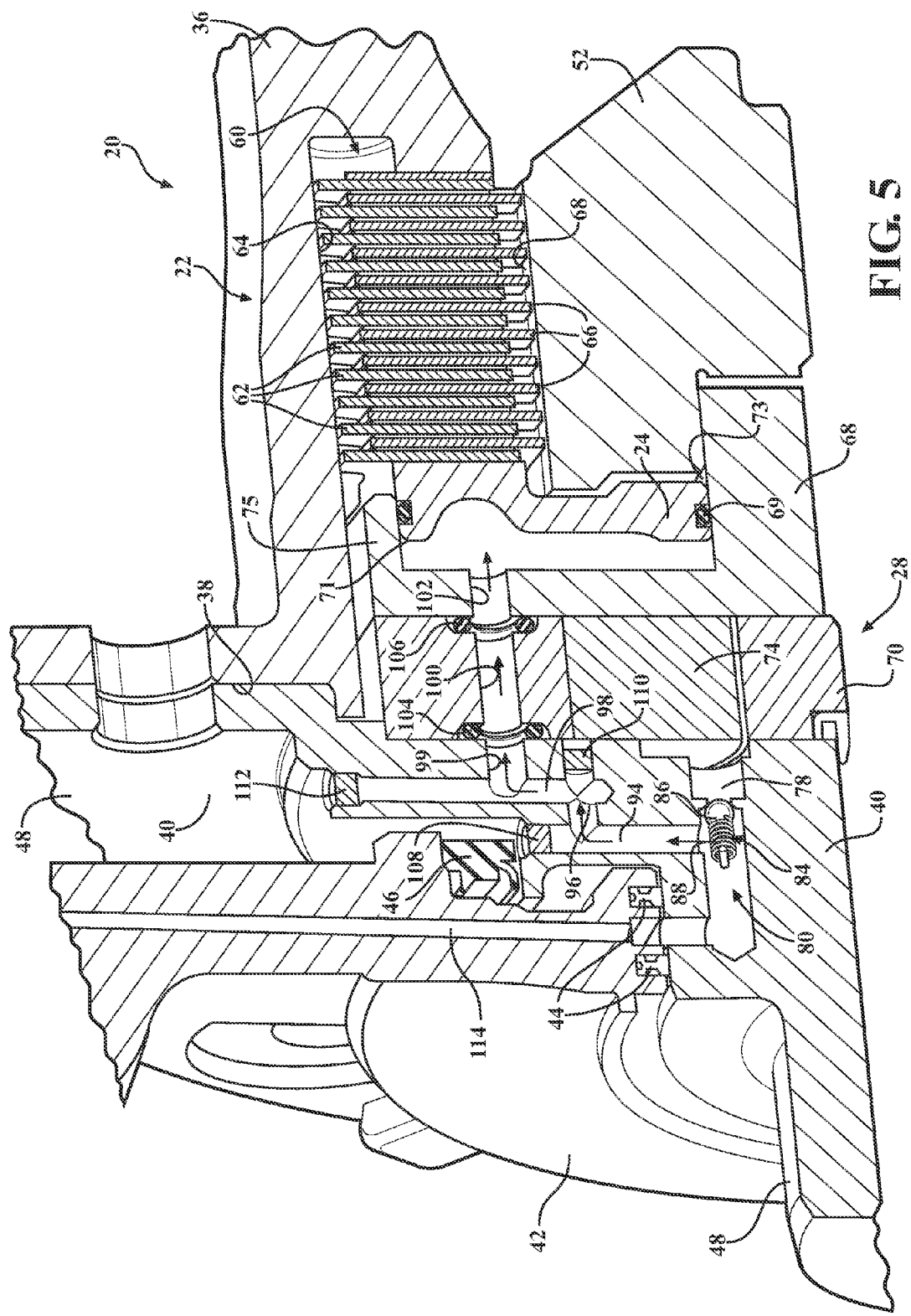
FIG. 5 is an enlarged cross-sectional side view of the hydraulic coupling shown in FIG. 4 illustrating the coupling mechanism and the fluid path when the coupling mechanism is in its closed position.

More specifically, and as shown in the representative embodiments illustrated herein, the casing 20 is rotatably driven by the torque input member 16 such that torque is transmitted through the housing 18 and the casing 20 to the pair of rotary members 12, 14. To this end, the torque input member 16 includes a drive shaft 30 and a pinion gear 32. A ring gear 34 is mounted to the casing 20 in meshing relationship with the pinion gear 32. The casing 20 includes a gear case 36 having an open end 38 and an end cap, generally indicated at 40, operatively mounted to the gear case 36 to close the open end 38. In the embodiment illustrated herein, the end cap 40 may also be referred to as the "left hand case." This component derives its name from the fact that it is mounted to the left hand side of the gear case 36 as illustrated in these figures. However, those having ordinary skill in the art will appreciate that these views are relative and the "left hand case" could easily be considered the "right hand case" if viewed from a different perspective. Thus, the reference to "left hand" as used herein is only for purposes of description and not by way of limitation. A plenum housing, generally indicated at 42, is non-rotatably supported on the left hand case 40. To this end and as best shown in FIGS. 3 and 5, the plenum housing 42 employs a plurality of seals 44, 46 that interface between the plenum housing 42 and the hub 48 of the left hand case 40. Both the gear case 36 and the left hand case 40 include hubs 48, 50, respectively. Each one of the rotary members 12, 14 is supported for rotation in the hub 48, 50 of either the gear case 36 or the left hand case 40.

The differential mechanism 15 includes a pair of side gears 52, 54 that are mounted for rotation with the respective one of the pair of rotary members 12, 14 in the casing 20. A cross pin 56 is fixedly mounted to the gear case 36 for rotation therewith. A pair of pinion gears 58 are mounted for rotation with the cross pin 56 and in meshing relationship with each of the pair of side gears 52, 54. Thus, the differential mechanism acts to allow the rotary members 12, 14 to rotate at different speeds.

The coupling mechanism 22 includes a clutch assembly 60 having an open position, illustrated in FIGS. 1 and 3, wherein the side gears 52, 54 may rotate at different speeds and a closed position, illustrated in FIGS. 4 and 5, wherein the hydraulic coupling 10 is locked so that the side gears 52, 54 rotate at substantially the same speed.

More specifically as best shown in FIGS. 3 and 5, the clutch assembly 60 includes a plurality of annular plates 62 splined to the inner diameter 64 of the gear case 36 and a plurality of annular friction disks 66 splined to the outer diameter 68 of one 52 of the pair of side gears 52, 54. The annular plates 62 are interleaved between the annular friction disks 66. However, those having ordinary skill in the art will appreciate that the annular friction disks 66 may be supported for rotation by either of the side gears 52 or 54, or both. The plurality of annular plates 62 and annular friction disks 66 are interleaved between one another and act to rotate past one another in substantially non-contacting relationship when the clutch assembly 60 is in its open position, as illustrated, for example, in FIG. 3. However, those having ordinary skill in the art will appreciate that the term "non-contacting relationship" as used herein is relative and is not meant to indicate that the plates and friction disks 66 have absolutely no contact when the clutch assembly 60 is in the open condition. The annular plates 62 and friction disks 66 are also axially movable into frictional engagement relative to one another, thereby reducing relative rotation between the annular plates 62 and disks 66 when the clutch assembly 60 is in its closed position as illustrated in FIGS. 4 and 5. Thus, when the clutch assembly 60 is in its closed position, the side gears 52, 54 as well as the rotary members 12, 14, rotate together.

The hydraulic coupling 10 of the present invention also includes a piston plate 68 that is supported in the casing 20 between the pump 28 and the piston 24. The expandable chamber 26 is defined between the piston plate 68 and the piston 24. The piston 24 includes seals 69, 71 located at the piston's inner and outer periphery, respectively. The seals 69, 71 interface with lower 73 and upper 75 annular lips formed on the piston plate 68. The annular lips 73, 75 extend axially in spaced parallel relationship with respect to each other. Together the piston 24 and annular lips 73 and 75 along with the body of the piston plate 68 cooperate to define the expandable chamber 26. The piston 24 is moveable in response to a bias created by the pressurized fluid in the expandable chamber 26 from its first position wherein the clutch assembly 60 is in its open position, as illustrated in FIGS. 1 and 3 and a second position wherein the piston 24 moves the clutch assembly 60 to its closed position as illustrated in FIGS. 4 and 5 so that the side gears 52, 54 as well as the rotary members 12, 14 rotate together.

Figure 2:
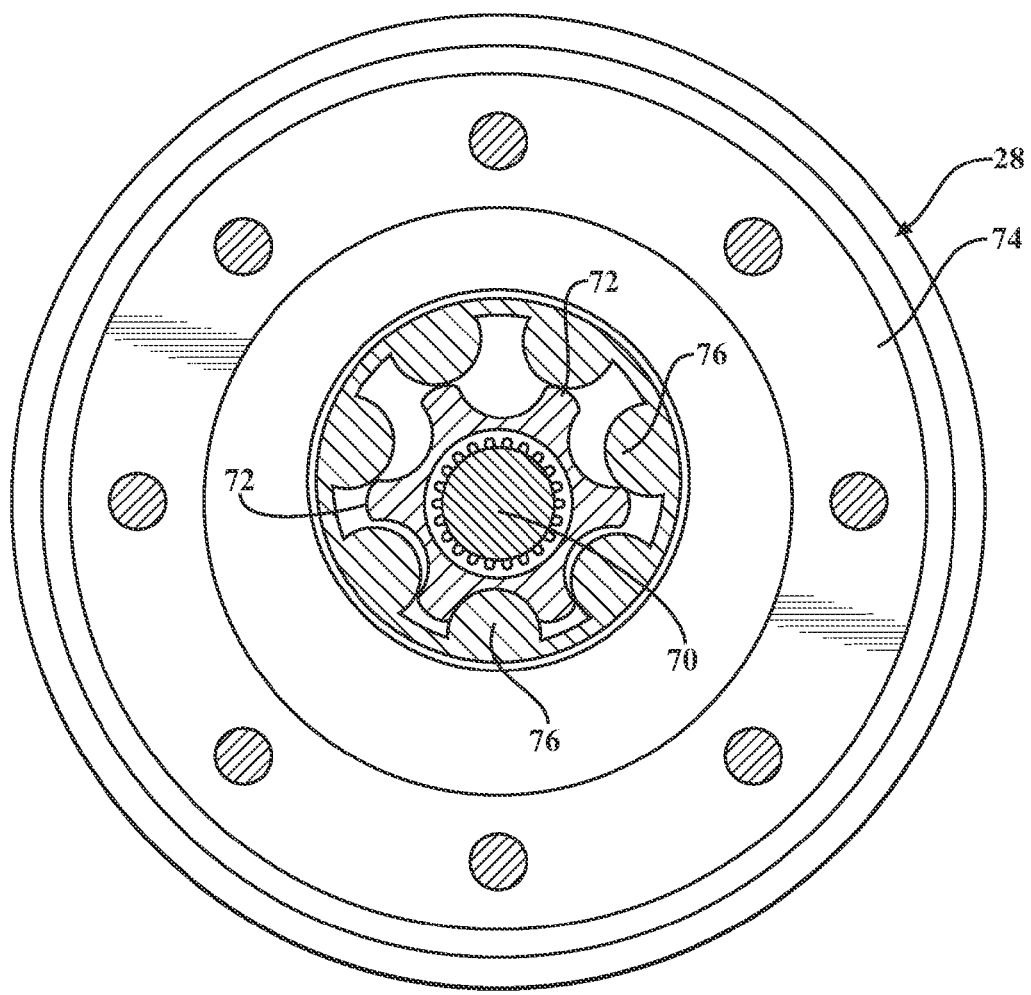
FIG. 2 is a sectional view taken through the pump employed in the hydraulic coupling of the present invention.

As best shown in FIG. 2, the pump 28 employed in one embodiment of the present invention may take the form of a geroter pump. The geroter pump includes an impeller 70 that is rotatably connected to one 12 of the pair of rotary members 12, 14 and has external teeth 72. The pump 28 also includes an internal ring gear 74 mounted for rotation with the casing 20 eccentrically with respect to the tooth impeller 70 and includes internal teeth 76 of a number one more than the impeller teeth 72 and in meshing relationship therewith. In this way, interaction between the internal ring gear 74 and the impeller 70 provides pumping action upon relative rotation between the gear case 36 and the toothed impeller 70. Relative rotation occurs when there is a differential in the rotational speed of the axle half shafts 12, 14. This relative rotation produces a source of pressurized fluid.

The pump 28 has an outlet 78 that is located in a direction away from the piston 24. An internal passage, generally indicated at 80, provides fluid communication between the outlet 78 of the pump 28 and the expandable chamber 26, as will be described in greater detail below. The hydraulic coupling 10 also includes a control valve, generally indicated at 82 in FIGS. 1 and 4, that controls the flow of pressurized fluid from the pump 28 to either a sump (not shown) or toward the expandable chamber 26 and the piston 24. In the embodiment illustrated herein, the control valve 82 is mounted on the plenum housing 42. However, those having ordinary skill in the art will appreciate that the control valve 82 could be mounted in any suitable place. The control valve 82 has an open position wherein pressurized fluid is directed toward the sump and a closed position wherein pressurized fluid is directed to the expandable chamber 26 to move the piston 24 to its second position to actuate the coupling mechanism 22 to couple the rotary members 12, 14 together.

In addition and referring once again to FIGS. 3 and 5, the hydraulic coupling 10 employs a check valve, generally indicated at 84, disposed between the outlet 78 of the pump 28 and the internal passages 80. The check valve 84 is operable to move from a closed position preventing fluid communication between the outlet 78 of the pump 28 and the internal passageways 80 as well as an open position that provides fluid communication between the outlet 78 of the pump 28 and the internal passageways 80. In the representative example illustrated herein, the check valve 84 includes a ball 86 and a spring 88 that biases the ball 86 to its closed position. The check valve 84 is responsive to fluid pressure generated by the pump 28 that exceeds a predetermined level and will open once this level has been reached. Similarly, as best shown in FIGS. 1 and 4 in the representative example illustrated herein, the control valve 82 includes a solenoid 90 and a valve member 92 that is moveable between an open position wherein pressurized fluid is directed to a sump and a closed position wherein pressurized fluid is directed through the internal passageways 80 and to the expandable chamber 26.

The internal passageways 80 include passage 94 disposed in fluid communication with the outlet of the check valve 84. The passage 94 is defined in the left hand case 40 in a single plane. In addition, the internal passageways 80 also include passage 98 that, like passage 94 is defined in the left hand case 40. Another intermediate passage 96 provides fluid communication between passage 94 and 98. Another passage 99 provides fluid communication between the passage 98 and a port 100 that extends through the internal ring gear 74. An aligned port 102 defined in the piston plate 68 provides fluid communication between the port 100 and the expandable chamber 26. Suitable O-rings 104, 106 are disposed on either end of the port 100 formed through the internal ring gear 74 of the geroter pump. Importantly, each of the passages 94, 96, 98 and 99 defined in the left hand case 40 all extend in a single plane. More specifically, each of these passages is straight. Any openings defined in the left case to form the passages 94, 96, 98 and 99 may be plugged, for example, at 108, 110 and 112. In addition to these passages, the internal passageways 80 also include a port 114 that provides fluid communication between the control valve 82 and the outlet 78 of the pump 28. In the embodiment illustrated herein, the port 114 is defined in the plenum housing and establishes fluid communication between the outlet 78 of the pump and the control valve 82. In turn, and as noted above, the control valve 82 controls flow of hydraulic fluid throughout the system and is capable of directing unwanted or unnecessary pressurized fluid to the sump or reservoir. In addition, those having ordinary skill in the art will appreciate that the port 114 may be defined in the left hand case 40 as with the other passages. With the above description in mind, however, those having ordinary skill in the art will appreciate that the internal passageways 80 may be formed in the left hand case 40 and plenum housing 42 in any suitable manner and can include any number of suitable passages and ports within the scope of the claimed invention.

In its operative mode, differential rotation between the rotary members 12, 14 mounted to the hydraulic coupling 10 causes actuation of the pump 28 which pressurizes the expandable chamber 26 and moves the piston 24 into engagement with the clutch assembly 60 when the solenoid valve 82 is closed. Under this operating condition and as best shown by illustration in FIG. 5, pressurized fluid flows from the pump outlet 78, past the check valve 84, through passages 94, 96, 98 and 99, through a port 100 formed in the internal ring gear 74 of the geroter pump 28, as well as an aligned port 102 formed in the piston plate 68 and then into the expandable chamber 26 defined between the piston 24 and the piston plate 68. It is important to note, however, the outlet 78 of the pump 28 is initially facing away from the expandable chamber 26 and the piston 24. This is an important feature of the present invention, as will be described in greater detail below.

Those having ordinary skill in the art will appreciate that when there is differential rotation between the rotary members, such as axle half shafts 12, 14, but the differential rotation is below a predetermined level, such as 100 RPM, typically there is no need to couple the rotary members together. This occurs, for example, when the vehicle is turning. Under these operational conditions, the solenoid control valve 82 is open and the hydraulic coupling is operating in its open mode. Nevertheless, and because there is differential rotation between the axle half shafts 12, 14 that is facilitated by the differential gear set under these circumstances, pressurized fluid is generated by the pump 28. When this occurs, the pressurized fluid may flow past the check valve 84. Because the outlet 78 of the pump 28 is directed away from the expandable chamber 26, the piston 24 and the clutch assembly 60, pressurized fluid flows directly through the port 114 to the sump or reservoir (not shown), as indicated by the arrows in FIG. 3. In this operating condition, pressurized fluid is never directed toward or never expands the chamber 26. Thus, no residual pressure acts on the piston 24 and no pressure is applied to the clutch assembly 60.

Thus, the present invention employs a porting path that reduces or essentially eliminates back pressure clutch torque that is often otherwise found in the related art where pressurized fluid is routed through the expandable chamber before it reaches the pump and can inadvertently create drag on the clutch pack. In addition, because the clutch assembly 60 is not pressurized under these conditions, the present invention reduces NVH when the hydraulic coupling is operating in the open condition. Similarly, because the check valve 84 is mounted in the left hand case 40, this reduces the packaging space required for the hydraulic coupling and simplifies the overall design of the device.

The hydraulic coupling of the present invention also reduces cost because the porting 94, 96, 98 and 99 formed in the left hand case 40 is essentially formed in single planes. More specifically and as noted above, each of the passages 94, 96, 98 and 99 are essentially linear and may be easily formed in the left hand case 40.

The invention has been described in great detail in the foregoing specification, and it is believed that various alterations and modifications of the invention will become apparent to those having ordinary skill in the art from a reading and understanding of the specification. It is intended that all such alterations and modifications are included in the invention, insofar as they come within the scope of the appended claims.

We claim:

1. A hydraulic coupling for use in a vehicle drivetrain including a pair of rotary members, said hydraulic coupling comprising:
a casing operatively supporting the pair of rotary members;
a coupling mechanism supported in said casing and operable to selectively couple the pair of rotary members together;
a piston moveably supported in said casing between a first position and a second position defining an expandable chamber;
a pump operable to provide a source of pressurized fluid in response to differential movement between the pair of rotary members, said pump having an outlet in a direction away from said piston;
an internal passage including first and second portions;
a control valve having an open position wherein pressurized fluid is directed toward a sump and a closed position wherein pressurized fluid is directed to said expandable chamber to move said piston to said second position to activate said coupling mechanism to couple the rotary members together;
a check valve disposed in said casing between said outlet of said pump and said first and second portions;
wherein an outlet of said check valve is simultaneously in direct fluid communication with said expandable chamber via said first portion and in direct fluid communication with said control valve via said second portion.

2. A hydraulic coupling as set forth in claim 1 wherein said check valve is operable to move from a closed position preventing fluid communication between said outlet of said pump and said internal passage and an open position providing fluid communication between said outlet of said pump and said internal passage.

3. A hydraulic coupling as set forth in claim 2 wherein said check valve includes a ball and a spring biasing said ball to said closed position.

4. A hydraulic coupling as set forth in claim 1 wherein said control valve includes a solenoid and a valve member moveable between the open position wherein pressurized fluid is directed to the sump and the closed position wherein pressurized fluid is directed through said internal passage and to said expandable chamber.

5. A hydraulic coupling as set forth in claim 1 wherein said casing includes a gear case having an open end and an end cap operatively mounted to said gear case to close said open end, said outlet of said pump defined in said end cap.

6. A hydraulic coupling as set forth in claim 1 wherein said hydraulic coupling further includes a piston plate supported in said casing between said pump and said piston, said expandable chamber defined between said piston plate and said piston.

7. A hydraulic coupling as set forth in claim 1 wherein said casing is rotatably coupled to a torque input member such that torque is transmitted through said housing to the pair of rotary members.

8. A hydraulic coupling as set forth in claim 1 further including a pair of side gears mounted for rotation with the respective one of the pair of rotary members in said casing and said coupling mechanism including a clutch assembly having an open position wherein said side gears may rotate at different speeds and a closed position wherein said hydraulic coupling is locked so that said side gears rotate at substantially the same speed.

9. A hydraulic coupling as set forth in claim 8 wherein said piston is moveable in response to a bias created by the pressurized fluid in said expandable chamber from said first position wherein said clutch assembly is in said clutch assembly open position and a second position wherein said piston moves said clutch assembly to said clutch assembly closed position so that said side gears rotate together.

10. A hydraulic coupling as set forth in claim 9 wherein said clutch assembly includes a plurality of annular plates splined to a gear case and a plurality of annular friction disks splined to one of said pair of side gears and interleaved between said plurality of annular plates, said annular plates and said annular friction disks act to rotate past one another in substantially non-contacting relationship when said clutch assembly is in said clutch assembly open position and said annular plates and frictions disks being axially moveable into frictional engagement relative to one another thereby reducing relative rotation between said annular plates and disks when said clutch assembly is in said clutch assembly closed position.

11. A hydraulic coupling as set forth in claim 10 wherein said casing includes the gear case, said gear case includes a cross pin fixedly mounted to said gear case for rotation therewith and a pair of pinion gears mounted for rotation with said cross pin and in meshing relationship with each of said pair of side gears.

12. A hydraulic coupling as set forth in claim 1 wherein said pump includes an impeller rotatably connected to one of the pair of rotary members and having external teeth and an internal ring gear mounted for rotation with said casing eccentrically with respect to the toothed impeller and including internal teeth of a number one more than the impeller teeth and in meshing relationship therewith to provide pumping action upon relative rotation between a gear case and the toothed impeller.

13. A hydraulic coupling as set forth in claim 1 wherein said first portion is disposed entirely in said casing.

14. A hydraulic coupling as set forth in claim 1 wherein said direction of said pump outlet includes a direction toward an inlet of said check valve.

15. A hydraulic coupling as set forth in claim 1 wherein said second portion is in indirect fluid communication with said expandable chamber via said first portion.

16. A hydraulic coupling as set forth in claim 1 wherein said first portion includes a plurality radially extending portions.

17. A hydraulic coupling as set forth in claim 1 wherein said first and second portions are in direct fluid communication with each other and said outlet of said check valve.

18. A hydraulic coupling as set forth in claim 1 wherein said casing includes a gear case, wherein said check valve and said first portion are disposed entirely within said gear case.

19. A hydraulic coupling as set forth in claim 4 wherein said control valve remains in said open position when a differential rotation between said rotary members is below a threshold level.

20. A hydraulic coupling as set for in claim 19 wherein the threshold level is 100 rotations per minute.

* * * * *

UNITED STATES PATENT AND TRADEMARK OFFICE
CERTIFICATE OF CORRECTION

PATENT NO.         : 8,579,752 B2
APPLICATION NO.    : 12/728327
DATED              : November 12, 2013
INVENTOR(S)        : Fox et al.

Page 1 of 1

It is certified that error appears in the above-identified patent and that said Letters Patent is hereby corrected as shown below:

In the Claims:
COLUMN 8, line 24 (Claim 12, line 9), delete "toothed"

Signed and Sealed this
Fourteenth Day of January, 2014

Michelle K. Lee
*Deputy Director of the United States Patent and Trademark Office*